(12) United States Patent
Czwaluk et al.

(10) Patent No.: US 9,138,956 B2
(45) Date of Patent: *Sep. 22, 2015

(54) SCREW SEPARATOR

(75) Inventors: Andreas Czwaluk, Vechta (DE); Matthias Rabener, Oelde (DE)

(73) Assignee: UTS Biogastechnik GmbH, Hallbergmoos (DE)

( * ) Notice: Subject to any disclaimer, the term of this patent is extended or adjusted under 35 U.S.C. 154(b) by 584 days.

This patent is subject to a terminal disclaimer.

(21) Appl. No.: 12/704,106

(22) Filed: Feb. 11, 2010

(65) Prior Publication Data

US 2011/0186498 A1 Aug. 4, 2011

(30) Foreign Application Priority Data

Feb. 2, 2010 (DE) .................... 20 2010 001 759 U

(51) Int. Cl.
| | |
|---|---|
| B30B 9/00 | (2006.01) |
| B01D 25/00 | (2006.01) |
| B01D 29/00 | (2006.01) |
| B01D 35/00 | (2006.01) |
| B01D 33/00 | (2006.01) |
| B01D 36/02 | (2006.01) |
| B01D 35/22 | (2006.01) |
| B01D 33/03 | (2006.01) |
| B01D 25/32 | (2006.01) |
| B01D 33/58 | (2006.01) |
| B30B 9/18 | (2006.01) |
| B30B 9/12 | (2006.01) |
| B30B 9/26 | (2006.01) |
| B01D 35/12 | (2006.01) |
| B01D 35/16 | (2006.01) |
| B01D 33/41 | (2006.01) |
| B01D 33/64 | (2006.01) |
| B01D 29/94 | (2006.01) |
| B01D 33/76 | (2006.01) |
| B01D 29/82 | (2006.01) |

(52) U.S. Cl.
CPC ... *B30B 9/18* (2013.01); *B30B 9/12* (2013.01); *B30B 9/26* (2013.01); *B01D 29/828* (2013.01); *B01D 29/94* (2013.01); *B01D 33/41* (2013.01); *B01D 33/648* (2013.01); *B01D 33/76* (2013.01)

(58) Field of Classification Search
USPC ........ 100/117; 210/202, 225, 413, 512.3, 415
See application file for complete search history.

(56) References Cited

U.S. PATENT DOCUMENTS

| | | |
|---|---|---|
| 631,072 A | 8/1899 | Grosse |
| 647,354 A | 4/1900 | Anderson |
| 2,109,398 A * | 2/1938 | McNitt .................... 100/148 |
| 2,215,944 A | 4/1947 | Vincent |
| 2,471,363 A | 5/1949 | Vincent et al. |
| 2,536,240 A | 1/1951 | Vincent |
| 3,003,412 A | 10/1961 | Vincent |
| 3,235,087 A | 2/1966 | Andrews et al. |
| 3,585,924 A * | 6/1971 | Nolan ............................ 100/43 |

(Continued)

*Primary Examiner* — Nam Nguyen
*Assistant Examiner* — Clare Perrin
(74) *Attorney, Agent, or Firm* — Greer, Burns & Crain, Ltd.

(57) ABSTRACT

A screw separator for separating solids out of suspensions, having at least one housing and at least one feed pipe for the suspension, at least one discharge pipe for liquids, and at least one outlet for the at least partially dewatered solids. At least one strainer basket is provided in the housing in which a screw is rotatably mounted where at least one press basket is mounted downstream of the strainer basket, and the strainer basket is received in the housing radially floating and the press basket, radially fixed.

14 Claims, 4 Drawing Sheets

(56) References Cited

U.S. PATENT DOCUMENTS

| | | | | |
|---|---|---|---|---|
| 3,672,641 A | * | 6/1972 | Slaby | 425/73 |
| 3,938,434 A | | 2/1976 | Cox | |
| 4,018,899 A | | 4/1977 | Seckler et al. | |
| 4,132,845 A | | 1/1979 | Covington, Jr. et al. | |
| 4,200,537 A | | 4/1980 | Lamort | |
| 4,214,377 A | | 7/1980 | Maffet | |
| 4,228,005 A | | 10/1980 | Covington, Jr. et al. | |
| 4,260,488 A | | 4/1981 | Condolios | |
| 4,291,619 A | * | 9/1981 | Hunt et al. | 100/43 |
| 4,309,291 A | | 1/1982 | Probstein et al. | |
| 4,347,134 A | | 8/1982 | Svehaug | |
| 4,358,371 A | | 11/1982 | Jameson et al. | |
| 4,520,724 A | | 6/1985 | Costarelli | |
| 4,818,403 A | | 4/1989 | Nagaoka | |
| 4,915,830 A | | 4/1990 | Mackay et al. | |
| 4,941,404 A | | 7/1990 | Tegtmeyer | |
| 4,997,578 A | | 3/1991 | Berggren | |
| 5,009,795 A | * | 4/1991 | Eichler | 210/744 |
| 5,012,731 A | | 5/1991 | Maisonneuve | |
| 5,118,427 A | * | 6/1992 | Eichler | 210/748.01 |
| 5,526,740 A | * | 6/1996 | Lee | 100/112 |
| 5,665,232 A | * | 9/1997 | Schlegel | 210/408 |
| 5,697,702 A | | 12/1997 | Triassi et al. | |
| 5,833,851 A | * | 11/1998 | Adams et al. | 210/413 |
| 6,550,376 B2 | | 4/2003 | Johnston | |
| 6,634,508 B1 | * | 10/2003 | Ishigaki | 210/415 |
| 8,151,702 B2 | * | 4/2012 | Marchesini | 100/117 |
| 2001/0030107 A1 | | 10/2001 | Simpson | |
| 2003/0015465 A1 | * | 1/2003 | Fick et al. | 210/234 |
| 2005/0172837 A1 | * | 8/2005 | Flor | 100/117 |
| 2006/0138054 A1 | * | 6/2006 | Menke et al. | 210/703 |
| 2006/0196370 A1 | * | 9/2006 | Kraft et al. | 100/117 |
| 2009/0211467 A1 | | 8/2009 | Flor | |

* cited by examiner

SCREW SEPARATOR

BACKGROUND

The present invention relates to a screw separator or a screw press separator for separating solids out of suspensions, comprising a housing and a suspension feed pipe, a liquids discharge, and an outlet for the dewatered solids.

These screw separators, often called filter screw presses, are per se known from the prior art. Screw separators have also become known in which two series-connected, separate filter screens are provided which are configured as strainer baskets. The first strainer basket serves as a liquid filter for separating out the bulk of the liquid portion while the downstream press basket comprises the solids compacted to form a slug. The pressure prevailing in the press basket is considerably increased such that maximum stresses occur there.

The known prior art is reliable in operation. There is the drawback, however, that the necessary precise matching of the press basket with the strainer basket involves high manufacturing requirements making these screw separators complex and expensive. Moreover the strainer basket and the press basket wear out rather quickly in operation.

It is therefore the object of the present invention to provide an improved screw separator which operates reliably and which is subjected to reduced wear while the quality is maintained or even improved.

SUMMARY

The screw separator according to the invention serves for separating solids out of suspensions, comprising at least one housing having at least one suspension feed pipe, at least one discharge for the separated liquid, and at least one outlet for the at least partially dewatered solids. The housing is provided with at least one strainer basket in which a screw is rotatably mounted. At least one press basket is mounted downstream of the strainer basket. The strainer basket is received in the housing radially floating and the press basket, radially fixed.

The screw separator of the invention has many advantages. A considerable advantage of the screw separator according to the invention consists in that the strainer basket is supported radially floating while the press basket is received radially fixed. In this way the strainer basket can adjust its position to the currently prevailing conditions while the press basket maintains its fixed position. For example if a coarse solid particle should be jammed at the edge of the screw vanes between the screw vanes and the strainer basket, then the floating support of the strainer basket allows the strainer basket to deflect radially while avoiding transfer of the arising pressure to the housing. On the other hand the slug guidance in the press basket is defined.

According to another configuration according to the invention the screw separator serves for separating solids out of suspensions, comprising at least one housing having at least one suspension feed pipe, at least one discharge for the separated liquid, and an outlet for the at least partially dewatered solids. The housing is provided with at least one strainer basket in which a screw is rotatably arranged. At least one press basket is mounted downstream of the strainer basket. The housing comprises at least one filter housing with the strainer basket mounted thereat or therein, and a press housing separate therefrom with the press basket mounted thereat or therein.

This screw separator of the invention again has many advantages. It is quite a considerable advantage of a screw separator according to the invention that the housing on the whole comprises at least one filter housing and a press housing separate therefrom. In the filter housing a strainer basket is provided through which the bulk of the dewatering substance flows while the press basket is mounted at the press housing. The press basket substantially contains the slug formed during operation.

The two-part housing structure provides ease of opening for the housing. This allows easy replacement of the press basket mounted in the press housing as needed. Moreover the strainer basket in the filter housing is readily accessible so as to allow routine maintenance checks and the like with minor effort.

In a particularly preferred configuration of the screw separators according to the invention the press housing is configured as a front cover which can be swung away or pivoted or it comprises such a front cover.

Preferably the front cover is mounted to the filter housing by means of at least one hinge or similar flap mechanism to be pivotal in particular in two or three positions. Multiple pivoting options in particular about parallel pivot axes offer the considerable advantage to virtually allow axial displacement due to the various pivot axes. This allows axial pulling of the front cover forwardly and subsequently pivoting it around one of the pivot axes so as to provide ready access to both the interior of the press housing and the interior of the filter housing.

Preferably at least one in particular replaceable ring is provided between the strainer basket and the press basket. The ring is in particular configured as a wearing ring and it may consist of plastic at least in part and/or of metal at least in part.

Such a wearing ring allows cost-effective operation of a screw separator according to the invention since the screw separator is preferably configured and structured such that in particular the wearing ring is the part most subjected to wear and in this way it can be replaced on a regular basis.

Preferably the wearing ring is configured to be tight in the radial direction. Or else the wearing ring may be configured to be permeable to liquids at least in sections or partially.

It is particularly preferred for the press basket and the wearing ring to be mounted in the front cover, both being pivoted along as the housing is opened. Advantageously the front cover is secured by way of at least one quick release. This allows on the whole to quickly and easily open up the housing for carrying out necessary maintenance or repairs. In the prior art the housing is accessible from the end only such that the components must be removed from the separator prior to checking, maintenance, or replacement.

In all of the configurations the front cover is preferably provided with the outlet or mouthpiece for the separated solids to emerge forwardly out of the mouthpiece or the outlet of the screw separator.

Advantageously the outlet is provided with a flap cover mechanism which is biased in the closed position. The flap cover mechanism may be configured as a spring flap cover mechanism comprising 2, 3, or 4 or yet more flap sections which are distributed over the circumference and individually or jointly biased in the closed position.

In particularly preferred configurations the screw is supported on the feeder side and may be guided at its free end. Preferably a pipe or a pipe-like structure is mounted in the press housing axially following the worm shaft of the screw and extending in particular as far as the outlet and particularly preferably through the outlet to the exterior. Preferably the pipe or the pipe-like structure axially closely follows the end of the worm shaft to reliably prevent the slug which may be a hollow cylinder from collapsing. Thus the slug will at all times be entirely supported from the interior over its entire length. The pipe-like structure may be configured to be hollow inside or else solid.

Preferably at least part of the pipe is received rotatably. Or else it is conceivable for at least part of the pipe to be received stationary. In preferred configurations the entire pipe is received stationary. Or else it is conceivable for the pipe to constitute a worm shaft extension that is mounted rotatable relative to the worm shaft.

The pipe-like structure or the pipe may be cylindrical in shape or it may have or comprise a cone section shape.

In all of the configurations it is preferred for the screw to be provided with at least two screw flights.

Advantageously the strainer basket is retained in the housing radially floating. The strainer basket may be mounted radially floating in particular in a range between 0.5 and 6 mm, preferably in a range between 1 and 3 mm and particularly preferably by approximately 2 mm.

In contrast thereto the press basket is retained radially fixed and in particular axially fixed as well.

The inner diameter of the press basket is preferably larger than the inner diameter of the strainer basket to ensure a smooth transition of the slug from the strainer basket into the press basket.

In particular the manufacturing tolerance of the press basket may be considerably larger than the manufacturing tolerance of the strainer basket. Care is taken, however, for the maximally possible inner diameter of the strainer basket including the possible manufacturing tolerance to not exceed the minimally possible inner diameter of the press basket.

The inner diameter of the strainer basket is matched to the outer diameter of the screw. The remaining radial gap between the radially outer sides of the filter screw and the inner surface of the strainer basket is <2 mm and in particular <1 mm and particularly preferably in the range between 0.2 and 0.7 mm. In specific configurations the gap is less than 0.5 mm.

The gap width is in particular less than 1% of the outer diameter of the screw vanes, in particular less than 0.5% of the outer diameter of the screw vanes and particularly preferably between 0.05% and 0.3% of the outer diameter of the screw vanes.

If the gap is too wide, water may spurt through the screw separator such that the function achieved is insufficient. On the other hand, too wide gaps cause the sediment removal from the strainer basket to be interrupted such that the strainer basket will clog up and the filtering function of the strainer basket is no longer ensured.

All of the configurations allow provision of at least one inspection hole in the housing which is in particular fastened by at least one quick release. At least one inspection hole may be closed by a transparent inspection glass to allow looking into the housing from the exterior even when it is closed.

In all of the configurations preferably at least one drive is provided which is in particular configured as an electric motor or a hydraulic motor.

To transfer vibrations in particular into the filling space of the screw separator, at least one vibrating device may be provided. By means of the vibrating device vibrations are introduced into the feeder region, carrying over at least as far as the inlet region of the strainer basket. The vibrating device is preferably mounted external of the feeder region, transferring the vibrations of the vibrating device via supporting ribs or similar means to a vibrator located in the liquid. A membrane may ensure sealing from the interior. All the vibrating elements may be supported by springs or rubber buffers or the like, moving correspondingly at least in the vertical and/or horizontal direction.

BRIEF DESCRIPTION OF THE DRAWINGS

Other advantages and possibilities of application of the present invention can be taken from the exemplary embodiment which will be discussed below with reference to the accompanying figures.

These show in.

DETAILED DESCRIPTION

Figure 1:
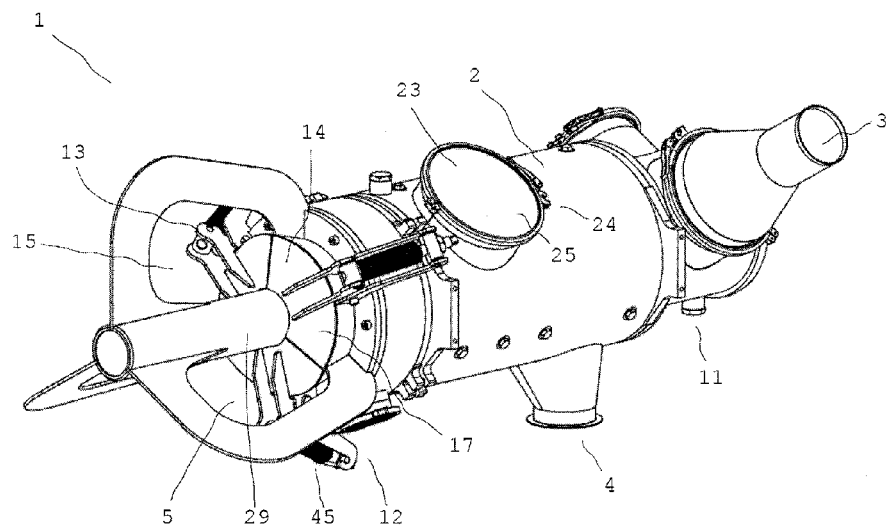
FIG. 1 a perspective view of an inventive screw separator in a closed position.

The screw separator 1 illustrated in FIG. 1 in a slightly perspective view in a closed state comprises a housing 2. The housing 2 is provided with a feed pipe 3 and with a discharge pipe 4 mounted in the lower region.

In the front region one can recognize the outlet 5 at the mouthpiece of the screw separator 1. The ejection controller 13 at the outlet 5 comprises a flap cover mechanism 14 configured as a spring flap cover mechanism comprising three cover sections 17 each being biased in the closed position 15 as illustrated in FIG. 1 by way of springs 45 such as disk springs or coil springs.

Unlike the illustrated embodiment the flap cover mechanism 14 may consist of four or five cover sections 17 each of which is separately biased in the closed position 15 by way of dedicated springs 45.

An inspection hole 23 provided with a cover that is for example configured as an inspection glass 25 and attached to the housing via a quick release 24 allows ready access to the interior of the screw separator 1. With the inspection hole 23 closed by an inspection glass 25, such inspection glass also permits inspecting the interior of the screw separator 1 during operation. In this way one can for example determine whether the filter screen of the strainer basket has clogged up with residue or the like.

In operation a suspension is filled into the feed pipe 3 to be separated by the screw separator 1 into liquid and solid constituents.

In operation a slug 35 will form (see FIG. 7) which is continuously moved towards the outlet 5 while new solid particles from the supplied suspension are continuously deposited at the rear end of the slug 35 thus forming a new slug.

Figure 2:
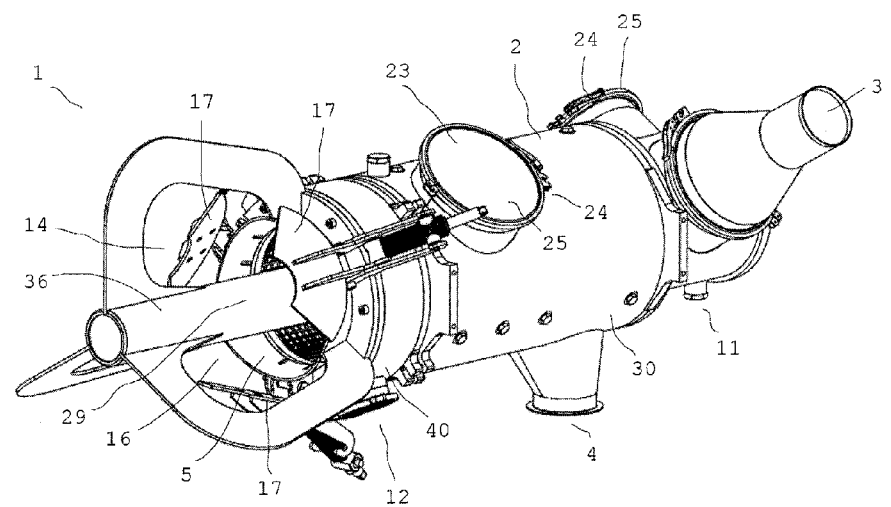
FIG. 2 the screw separator from FIG. 1 with the ejection controller in an open position.

In FIG. 2 the ejection controller 13 with the flap cover mechanism 14 is illustrated in an open position 16 in which for example the pressure from the slug 35 (not illustrated here) opens the cover sections 17 of the flap cover mechanism 14 against the spring force of the springs 45 such that the front part of the slug 35 is pushed out of the outlet.

Figure 3:
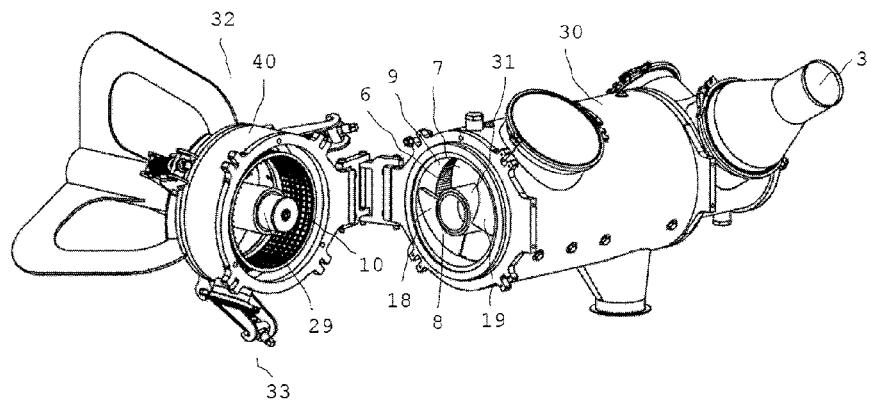
FIG. 3 the screw separator according to FIG. 1 with the front cover swung open.
Figure 4:
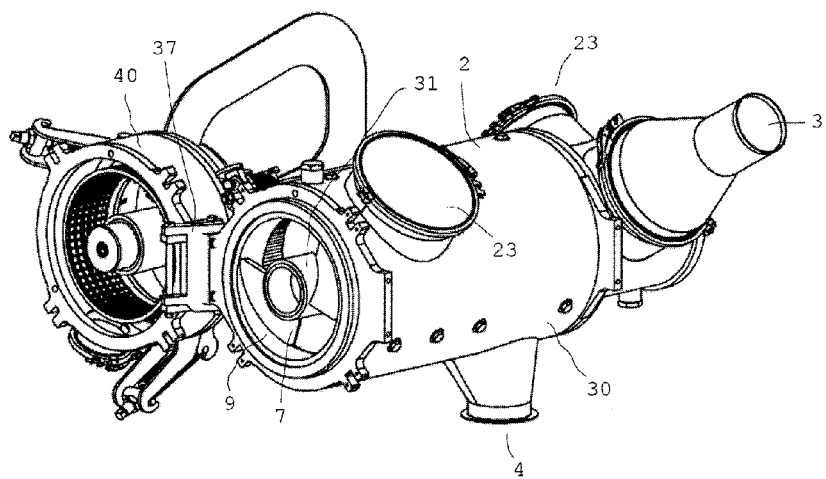
FIG. 4 the screw separator according to FIG. 1 with the front cover wide open.

In FIG. 3 the screw separator 1 is illustrated with the housing 2 partially opened and in FIG. 4, fully opened.

The housing 2 comprises the filter housing 30 and the press housing 40 which follows the filter housing 30 in the axial direction. It is clearly obvious that the two housing parts namely, the filter housing 30 and the press housing 40 which serves as the front cover 32, are interconnected via a hinge 37 which hinge 37 or swing mechanism comprises two or presently three pivoting axes parallel to one another such that the front cover 32 can be swung forwardly and then away to the side. The hinge 37 allows limited axial movement.

In the open position according to the FIGS. 3 and 4 the screw 7 is visible in the filter housing 30, being provided with screw vanes 8 in two screw flights 18 and 19 to thus provide a double-pitch screw 7.

In the axial direction the screw vanes 8 terminate in a separate ring or wearing ring 9 which is presently mounted at the front end of the filter housing 30 to be freely accessible. This enables ease of replacement for the wearing ring 9. Viewed from the feeder 3 towards the outlet 5, the strainer basket 6 lies in front of the wearing ring 9. The ring or wearing ring 9 may consist of plastic and/or fiber-reinforced materials, at least in part of a metal or a metal alloy, or else of wood and in particular hardwood.

In operation at least part of the liquid portion of the suspension emerges outwardly passing through the strainer basket that is configured as a filter screen and inside the filter housing 30 is diverted to the discharge 4.

The press housing 40 is fastened to the filter housing 30 by means of a quick release 33 or else several quick releases 33. For closing the housing 2 the front cover 32 is first swung towards the filter housing 30. In closing, the front tip of the pipe 29 or the pipe-like structure 36 enters the interior of the worm shaft 31 of the screw 7, thus guiding the worm shaft during operation.

The slug 35 forming in the filter housing 30 or slug 35 already having formed therein is presently hollow cylindrical in shape. The pipe 29 following the axial end of the worm shaft 31 stabilizes the interior of the slug 35. The fact that the outer diameter of the pipe 29 is matched to the outer diameter of the worm shaft 31 ensures ease of transition of the slug onto the pipe 29 in the press housing 40. The pipe 29 may likewise be configured slightly conically, tapering or widening in the axial direction.

In the press housing 40 the press basket 10 is provided through the filter surface of which the remaining squeezed-out liquid can emerge radially outwardly into the housing 2 before the slug 35 emerges outwardly through the front mouthpiece or the outlet 5. The separated solids can then be put to suitable use.

Figure 5:
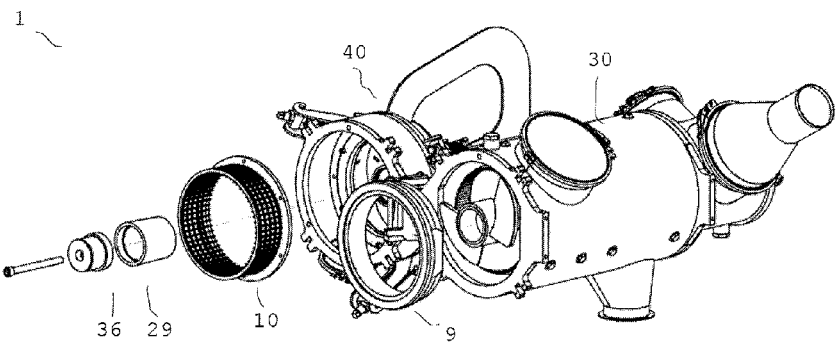
FIG. 5 the screw separator according to FIG. 1 with some of the components removed in an exploded view.

FIG. 5 shows a schematic exploded view of the screw separator 1 in an open position. One can clearly recognize the wearing ring 9 mounted axially in front of the filter housing 30. In front of the press housing 40 the press basket 10 and the pipe 29 or the pipe-like structure 36 is illustrated which serves as an axial extension of the worm shaft 31.

Figure 6:
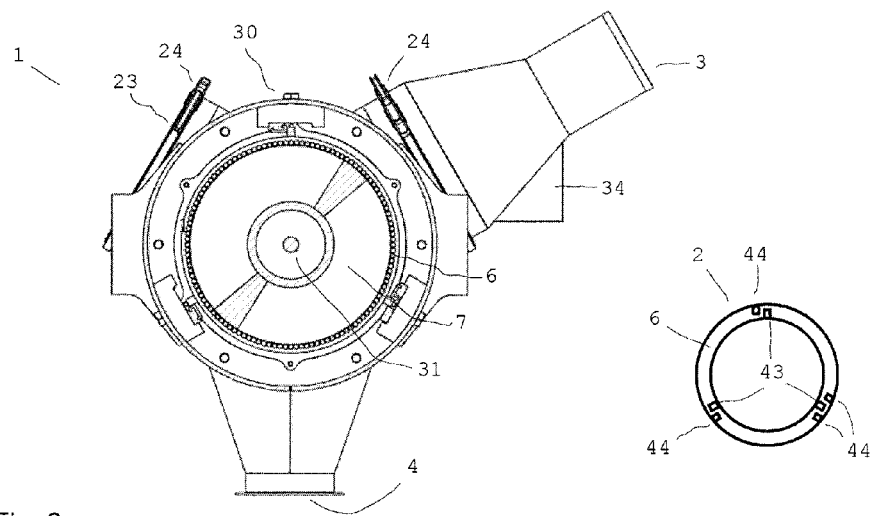
FIG. 6 a front view of the filter housing of the screw separator according to FIG. 1 and a schematic cross-section.

FIG. 6 shows a front view of the filter housing 30 allowing a look into the interior of the screw separator 1. The suspension supplied through the feed pipe 3 arrives in the feeder region 38 (see FIG. 8) and by means of the screw 7 is conveyed forwardly in the direction of the outlet 5.

The worm shaft 7 carries the screw vanes 8 and is guided tight in the strainer basket 6. The strainer basket 6 is configured as a filter screen, comprising rods arranged over the periphery in parallel in the longitudinal direction and spaced apart by gaps in the peripheral direction between about 1 and 2 mm. The exact gap size depends on the intended application and may be smaller or larger in relation to the materials to be separated.

Over the outer periphery of the strainer basket 6 three rods 43 are distributed symmetrically, being secured to the strainer basket 6 and providing a radially floating support of the strainer basket 6 and preventing the strainer basket 6 from rotating along with the screw 7. To this end a total of four rods 44 are presently provided in the housing 2 serving as retaining means to prevent the strainer basket 6 from rotating along. The arrangement principle of the rods 43 and 44 is shown in the schematic cross-section on the right in FIG. 6. One rod 43 of the strainer basket is provided on both sides with rails or rods 44 in the filter housing while only one rod 44 each is provided in the housing for the other rods 43. Since the screw 7 will always only rotate in one direction it is sufficient to provide two rods in the filter housing 2 for one rod 43 only. The strainer basket 6 is radially movable in the housing 2 by about 2 mm such that the strainer basket can adjust to occurring stresses.

One or more inspection holes 23 may be provided in different places with transparent or non-transparent covers.

Figure 7:
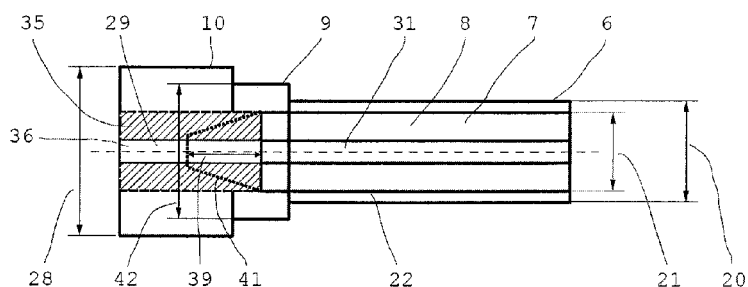
FIG. 7 a schematic longitudinal cross-section of another screw separator.

The feed pipe 3 or the feeder region 38 may be provided with a vibrating device 34 to intentionally introduce vibrations into the suspension or matter contained to achieve homogeneity of distribution and high efficiency of the screw separator 1. FIG. 7 shows a simplistic and in particular not true to scale cross-sectional view of a screw separator 1. The illustration in FIG. 7 shows in a highly magnified scale that the inner diameter 28 of the press basket is larger than the inner diameter 42 of the wearing ring 9 which in turn is larger than the inner diameter 20 of the strainer basket 6. The fact that each subsequent component is somewhat larger in its inner diameter than the preceding component allows to ensure that the slug 35 passes unobstructed from one component to the next.

This construction in particular allows to considerably increase the manufacturing tolerances for the press basket 10 so as to largely simplify manufacturing and reduce costs. The dimensions of the wearing ring 9 and of the press basket 10 ensure that their inner diameters are larger than is the inner diameter 20 of the strainer basket 6.

The pipe-like structure 36 or the pipe 29 inside the slug 35 stabilize the slug, preventing it from collapsing. The pipe 29 is in particular configured stationary so as to quite considerably reduce wear on the pipe 29. In conventional screw separators in which the worm shaft 31 extends to the exterior through the mouthpiece beyond the press basket, the pipe continuously rotates with the slug 35 that virtually does not rotate along.

In a conventional screw separator 1 the relative speed between the outside of the worm shaft 31 and the slug 35, given a worm shaft diameter of approximately 10 cm and a rotational speed of approximately 30 revolutions/minute, is roughly estimated 15 cm/second. In this example the advance rate of the slug is approximately 1 cm/second. This means that the relative speed between the slug 35 and the worm shaft 31 is a combination of the advance rate of 1 cm/second and the relative rotational speed of approximately 5 cm/second. For the screw separator 1 the relative speed between the slug 35 and the pipe 29 in the press basket 10 is approximately 1 cm/second thus corresponding to the advance rate of the slug 35 since the pipe is mounted stationary. In the region of the press basket 10 the stresses are highest since this is where the highest pressures occur. By means of this measure, wear can be reduced quite considerably.

The additional dotted line denotes a cone section 41 of another configuration of a screw 7 where the screw vanes 8 are radially tapering over an axial section 39. Here the largest radial diameter lies in the region of the ring 9. The axial section 39 over which the screw vanes radially taper may extend as far as and into the press basket 10. Then the worm shaft 31 extends as far as the edges of the screw vanes 8. A suitable pipe 29 may be axially mounted at the rear of the worm shaft 31. In this configuration of the screw vanes 8, also shown in a dotted line, the region of maximum stress again lies within the wearing ring 9. This configuration allows for the screw vanes to formally extend as far as into the press basket 10 while the stresses within the press basket 10 are concurrently reduced so as to increase durability. A stepped tapering is in particular conceivable.

The radial gap 22 between the outer diameter 21 of the screw vanes 8 and the inner diameter 20 of the strainer basket is intentionally small, for example 0.5 mm, while the outer diameter of the screw vanes may be 20 cm, 25 cm, or even 30 cm. This very narrow gap prevents water or the suspension from spurting forwardly which would interfere with slug formation. Furthermore the screw vanes 8 continuously free the strainer basket 6 interior from residues, thus preventing clogging up.

Figure 8:
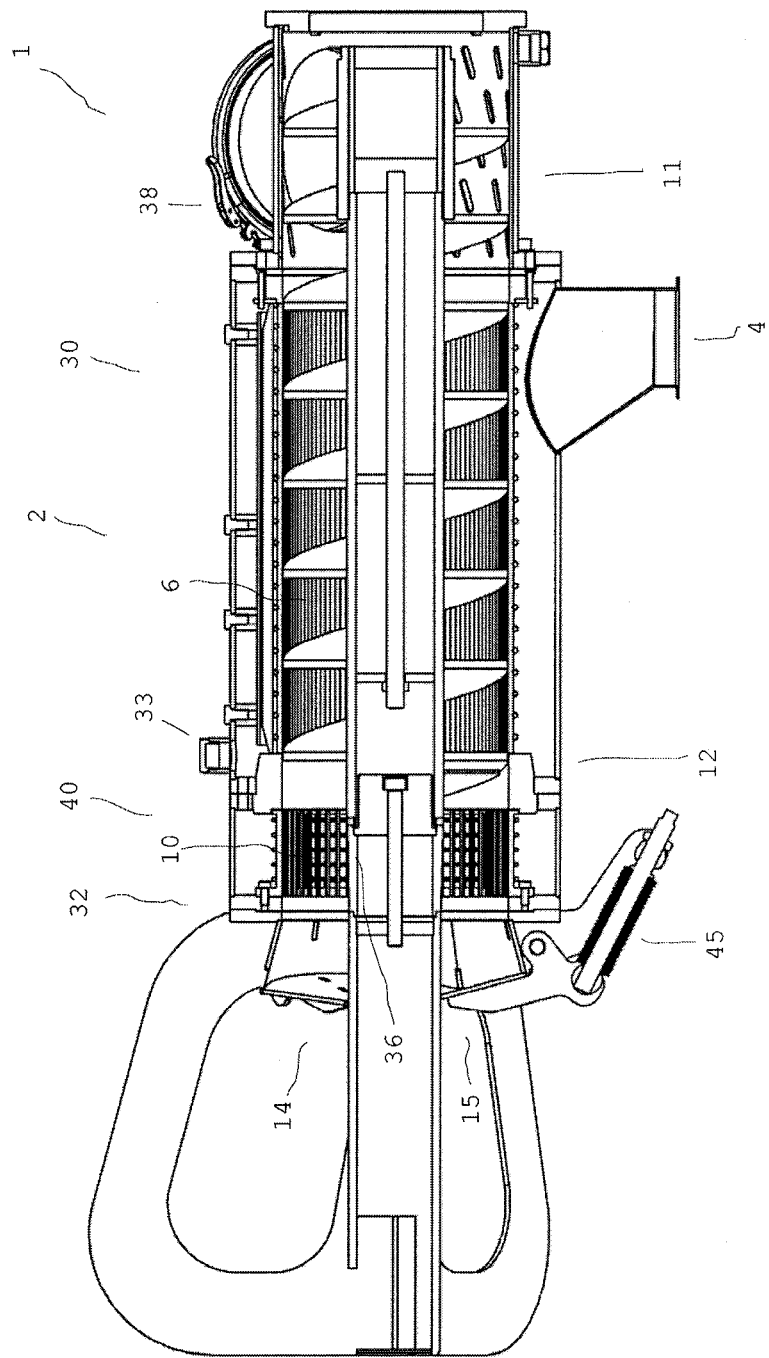
FIG. 8 a cross-section of the screw separator according to FIG. 1.

FIG. 8 shows a longitudinal cross-section of the screw separator 1. The suspension to be separated is fed to the feeder region 38 from where it is conveyed towards the strainer basket 6 by means of the screw vanes 8.

In the axially and radially floating strainer basket 6 the suspension charge is continuously compacted to thus form a slug 35 from the solids contained while the aqueous constituents run outwardly through the strainer basket 6 at least in part, draining off through the discharge 4. The screw vanes 8 terminate in the axial direction in a wearing ring 9 that is provided as a replaceable part.

The screw 7 is rotatably supported on the feeder side 11 and at its free end 12 it is guided by the pipe-like structure 36. It is as well conceivable to support the screw 7 at both ends.

The housing 2 consists of the filter housing 30 and the press housing 40 which is provided as a front cover 32 that can be swung away.

The front cover 32 is provided with a flap cover mechanism 14, presently having three cover sections 17 that are biased in the closed position via springs 45.

A pipe-like structure 36 is also retained in the front cover 32 configured as a hollow or else a solid pipe 29 which when closed axially follows the end of the worm shaft 31 which it guides.

On the whole the invention provides a screw separator which ensures high functional reliability, high durability, and reliable operation while also offering ease of maintenance.

Due to a separate ring 9 being provided between the strainer basket 6 which serves as a dewatering screen and the press basket 10 in which the effective portion of the screw vanes 8 terminates, the strainer basket 6 is subjected to reduced wear so as to achieve increased durability. This is again supported by the fact that the strainer basket 6 is received in the housing 2 to be radially floating while the press basket 10 is axially and radially fixed in the housing 2.

Another considerable advantage is the separate construction of the pipe 29 which axially follows the worm shaft 31 that terminates inside the housing 2. For one the pipe 29 ensures that the slug 35 retains stability inside the press basket 10 and for another the pipe 29 received in particular stationary considerably reduces wear on the worm shaft 31.

On the whole a screw separator 1 offering flexible applications is provided which achieves high durability at low operational costs.

While a particular embodiment of the present screw separator has been described herein, it will be appreciated by those skilled in the art that changes and modifications may be made thereto without departing from the invention in its broader aspects and as set forth in the following claims.

The invention claimed is:

1. A screw separator for separating solids out of suspensions, comprising:
   at least one housing and at least one feed pipe for a suspension, said at least one housing including a plurality of rods;
   at least one discharge pipe for liquids;
   at least one outlet for at least partially dewatered solids;
   at least one strainer basket provided in the at least one housing, said at least one strainer basket including at least one rod extending from said at least one strainer basket;
   a screw rotatably mounted in the at least one housing; and
   at least one press basket mounted downstream of the at least one strainer basket in the at least one housing,
   wherein the at least one strainer basket is disconnected from and radially floating in the at least one housing, said at least one rod of said at least one strainer basket being positioned between and spaced from two of said plurality of rods of said at least one housing such that said at least one rod of said at least one strainer basket engages said two of said plurality of rods of said at least one housing to inhibit movement of said at least one strainer basket in either rotational direction relative to said at least one housing, and
   wherein the at least one press basket is radially fixed to the at least one housing.

2. The screw separator according to claim 1, wherein a press housing is configured as a front cover which can be swung or pivoted away from the at least one housing.

3. The screw separator according to claim 1, wherein a replaceable ring is mounted between the at least one strainer basket and the at least one press basket.

4. The screw separator according to claim 3, wherein the replaceable ring is a wearing ring that is configured to be tight in a radial direction.

5. The screw separator according to claim 4, wherein the at least one press basket and the wearing ring are mounted in a front cover.

6. The screw separator according to claim 2, wherein the front cover is provided with the at least one outlet.

7. The screw separator according to claim 1, wherein at least one ejection controller is provided at the at least one outlet.

8. The screw separator according to claim 1, wherein the at least one outlet includes a flap cover mechanism comprising at least three flap cover sections which are distributed over a circumference of the at least one outlet.

9. The screw separator according to claim 2, wherein a pipe is mounted in the press housing axially following a worm shaft of the screw and extending outwardly through the at least one outlet.

10. The screw separator according to claim 9, wherein at least part of the pipe is received rotatably.

11. The screw separator according to claim 9, wherein at least part of the pipe is received stationary.

12. The screw separator according to claim 1, wherein an inner diameter of the at least one press basket is larger than an inner diameter of the at least one strainer basket.

13. The screw separator according to claim 1, further comprising at least one vibrating device configured to generate vibrations that are introduced into a feeder region on the at least one housing such that the vibrations carry into an inlet region of the at least one strainer basket.

14. The screw separator according to claim 13, wherein the at least one vibrating device is arranged externally of the feeder region, wherein the vibrations are transferable via supporting ribs to a vibrator located in a liquid in the at least one housing; and
   wherein a membrane ensures that an interior is sealed and all vibrating elements are supported by one of springs or rubber buffers allowing movement at least in a vertical direction.

* * * * *